United States Patent [19]

Shults et al.

[11] 3,713,994

[45] Jan. 30, 1973

[54] ELECTROCHEMICAL AIR POLLUTION MONITORING DEVICE AND METHOD OF USE THEREOF

[75] Inventors: Wilbur D. Shults, Oak Ridge, Tenn.; John R. Kuempel, Greencastle, Ind.

[73] Assignee: The United States of America as represented by the United States Atomic Energy Commission

[22] Filed: March 16, 1971

[21] Appl. No.: 124,697

[52] U.S. Cl. ..............................204/1 T, 204/195 H
[51] Int. Cl. ...............................................G01n 27/42
[58] Field of Search ..............204/195 H, 1 T; 324/29; 23/232 E, 254 E

[56] References Cited

UNITED STATES PATENTS 3,031,385   4/1962   Johnson et al. .......................204/1 T

OTHER PUBLICATIONS

I. M. Kolthoff et al., "Polarography", Vol. 1, pp. 358–359,(1952).

Primary Examiner—G. L. Kaplan
Attorney—Roland A. Anderson

[57] ABSTRACT

An electrochemical monitoring device has been provided for measuring air pollutants. A thin layer of electrolyte solution is exposed on one side to the atmosphere and on the other side to a mercury pool electrode. Electrochemical reactions which take place at the mercury electrode surface due to the presence of certain pollutants alter the current flow through the mercury pool at a given voltage, thereby providing an indication of the amount of the particular pollutant under study. Since certain important pollutants undergo electrochemical reactions with mercury at different potentials and other pollutants react chemically with mercury, several methods of operation can be used. In one method, selective current responses are obtained for the detection and determination of different pollutants by varying the mercury electrode potential. In a second method, the products of chemical or electrochemical reaction are accumulated in the thin layer of solution or at the electrode surface, and are periodically determined by current coulometric measurement. These two methods can be used jointly and supplement each other.

8 Claims, 6 Drawing Figures

INVENTORS.
Wilbur D. Shults
John R. Kuempel
ATTORNEY.

Fig. 6

ELECTROCHEMICAL AIR POLLUTION MONITORING DEVICE AND METHOD OF USE THEREOF

BACKGROUND OF THE INVENTION

The present invention was made during the course of, or under, a contract with the United States Atomic Energy Commission.

The invention described herein relates generally to air pollution monitoring and more particularly to a device for electrochemically monitoring air pollutants to obtained both qualitative and quantitative measure of certain atmospheric pollutants.

As increasing numbers of airborne pollutants are scrutinized as to their effect on the health and well-being of man, it becomes increasingly important to find and develop analytical devices that are both sensitive and specific for these different substances. Electrochemical techniques offer great potential for air monitoring purposes. Monitors based upon electrochemical cells can be both selective for, and sensitive to, a number of pollutants, and can be easily incorporated into relatively inexpensive, automated systems. Because electrochemical techniques are "solution oriented," it has been the common practice to scrub pollutants from air and to analyze the resulting solution by conventional electrochemical procedures. Recently, commercial devices have appeared that incorporate a membrane barrier between the air being monitored and the electrochemical sensing element (which includes a small quantity of solution). Pollutants must diffuse through a rubber or plastic membrane in order to react at the electrode. Accordingly, the use of a membrane offers some selectivity in performance and considerable simplicity in cell design, but does so at the expense of sensitivity and response time. This invention is of especial value in that the sensitivity of electrochemical monitors has been greatly enhanced by the development of a thin-layer cell without a membrane. This cell provides good selectivity and much improved response time. By using this technique, it is feasible to monitor several pollutants simultaneously, thereby increasing the flexibility of a single instrument. In view of the recent efforts being expended in controlling the environment and especially in pollution abatement, there is clearly a need for a highly flexible device for selective detection and measurement of certain atmospheric pollutants which is relatively simple and easy to maintain.

SUMMARY OF THE INVENTION

In view of the need for atmospheric pollution monitoring devices, it is an object of this invention to provide a simple and inexpensive system which will selectively and sensitively detect and quantitatively measure airborne pollutants.

It is another object of this invention to provide a means for electrochemical monitoring of electrochemically active airborne pollutants using a thin-layer electrochemical detector.

A further object of this invention is to provide a device and method thereof which have a sensitivity for determining the amount of certain atmospheric pollutants at the parts per billion level.

Briefly, the invention is a device for electrochemical monitoring and measurement of electrochemically active pollutants in a gaseous medium wherein a thin-layer electrochemical cell is established by a thin layer of electrolyte solution held in suspension over a surface of a mercury pool electrode while exposed on the opposite surface to the gaseous medium. First and second electrodes are placed in contact with the electrolyte at opposite extremes so that current and/or potential control is established at a third electrode in contact with the mercury pool. The method of operation is determined by appropriate control of electrode potentials. Some pollutants can be measured directly by monitoring the current between the first and second electrodes at a given voltage on the mercury electrode while others can be electrochemically accumulated and periodically measured by measuring current responses for various mercury electrode potentials.

Other objects and many of the attendant advantages of the present invention will be obvious from the following detailed description taken in conjunction with the accompanying drawings.

DETAILED DESCRIPTION

Figure 1:
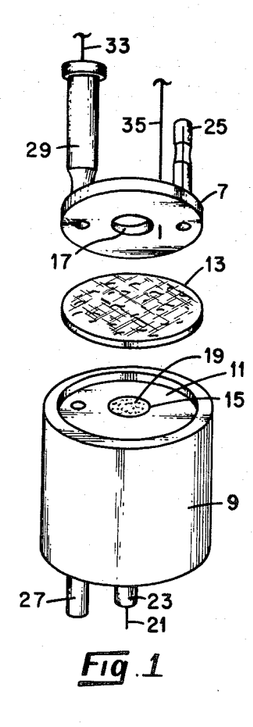
FIG. 1 is an exploded view of an electrochemical detector cell according to the present invention.
Figure 2:
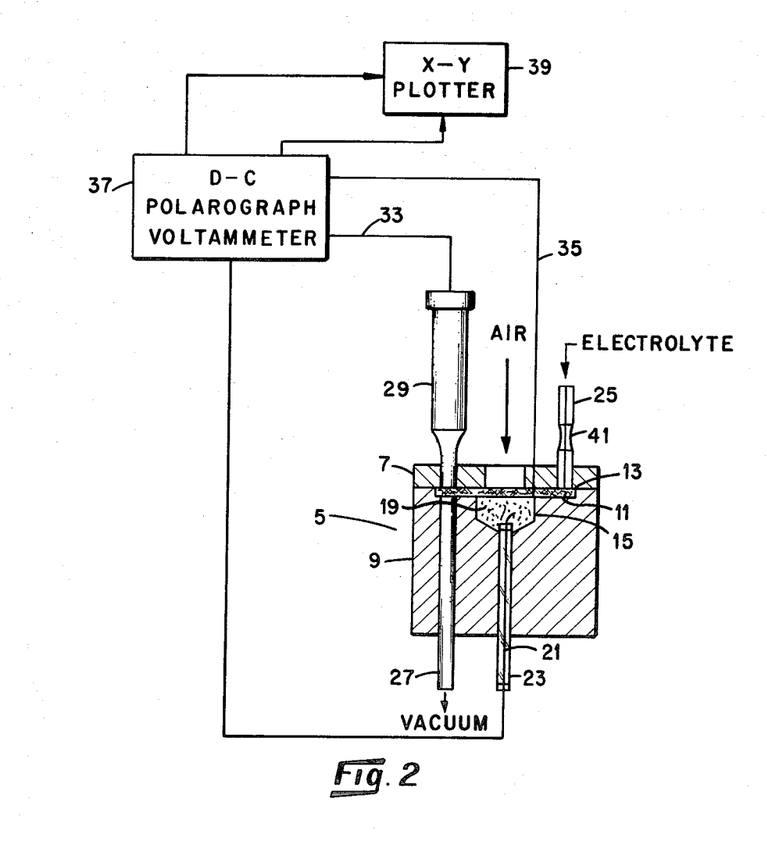
FIG. 2 is a cross-sectional view of the detector cell of FIG. 1.

Referring now to FIGS. 1 and 2, there is shown the preferred embodiment of an electrochemical detector cell for monitoring airborne pollutants according to the present invention. A housing 5 that is shown to be tubular in cross section and consists of an annular ring top 7 and a cylindrical bottom portion 9 may be formed of any well known non-conductive material. In practice it has been found that the body can be readily machined from a Teflon rod which provides the desired properties. The bottom 9 has a cylindrical recessed portion 11 at the upper surface thereof adapted to receive a porous member such as a filter paper disc 13 which is held in recess 11 by securing the top 7 to the housing bottom 9 by conventional means so as to form a reservoir compartment. The bottom portion 9 of housing 5 also has a cup 15 formed therein centrally located in the bottom portion of recess 11 in axial alignment with the opening 17 of annular ring top 7. Cup 15 is filled with mercury to form a mercury pool electrode 19, the upper surface of which is contiguous with the lower surface of disc 13. An electrical lead 21, preferably a platinum wire, is held in contact at one end with the mercury pool electrode 19 and extended through a sealed glass tube 23 which is sealably disposed in an opening through the bottom of housing 5. A constructed capillary tube 25 is connected through an opening in cap 7 which communicates with the recessed area 11 so as to provide a controlled flow of electrolyte solution to the filter paper disc 13 from a reservoir of electrolyte solution (not shown). The electrolyte is drawn across the filter paper disc 13 and into an exit tube 27 which extends through an opening in the bottom 9 of housing 5 by means of vacuum pumping. The exit tube is connected at one end in fluid communication with the recessed area 11 at a point diametrically opposite to the entrance of the electrolyte solution and connected to a vacuum source (not shown) at the other end so that an even distribution of flow of the electrolyte solution held in the filter paper disc 13 is provided over the upper surface of the mercury electrode 19. A saturated calomel reference electrode in the form of a tube 29 is connected through cap 7 in alignment with exit tube 27. Electrical connection to the electrolyte solution is provided by means of an electrical lead 33 connected to the upper end of the calomel electrode 29. An auxiliary platinum electrode 35 is provided in contact with the electrolyte at a point adjacent the capillary inlet tube 25 so that either current and/or potential control can be established at the mercury electrode 19 by using conventional three-electrode volt-ammetric techniques. A voltammeter 37 such as the Controlled-Potential DC Polarograph-Voltammeter described in *Analytical Chemistry*, 41, 772 (1969) may be used. Its reference electrode input is connected to the reference electrode lead 33, its auxiliary (or counter) electrode input is connected to the auxiliary electrode 35, and its controlled (or working) electrode input is connected to the mercury pool electrode 19 through lead 21. The outputs of the voltammeter are connected to respective X and Y inputs of a conventional X-Y plotter 39, whereby various measurements may be recorded.

In operation fresh electrolyte solution is slowly drawn through the filter paper disc 13 over the mercury pool electrode 19 from the restricted capillary tube 25 by applying a vacuum to the exit tube 27. Although various suitable electrolyte solutions may be used, a solution containing 0.2 F NaSO$_4$, 0.05 F Na$_2$HPO$_4$ and 0.01 F NaH$_2$PO$_4$ is preferred, wherein F is concentration expressed as formula weight in grams per liter of solution. The solution is prepared using reagent grade chemicals. The rate of flow of electrolyte is typically fixed at about one drop every 15 seconds by the restriction 41 of the capillary supply tube 25. The air stream containing the pollutant under study is directed onto the outer surface of the electrolyte solution through the central opening 17 in the top 7.

The methods by which the measurements of the airborne pollutants are made with the above described device may take the form of one of the two following procedures. The first case involves the measurement of certain airborne pollutants which diffuse through the thin layer of electrolyte held by disc 13 and then react at the surface of the mercury electrode 19. In this case, the potential of the mercury electrode 19 is maintained at a constant value with respect to the reference electrode 29 while the current resulting from the electrochemical reaction taken between leads 23 and 35, is monitored continuously. Since the current resulting from the reaction is proportional to the concentration of the compound or species under study, one can provide a quantitative measure of the amount of the compound. Also, since the important pollutants, such as sulfur dioxide, chlorine and hydrogen chloride undergo electrochemical reactions with mercury at different potentials, one can obtain selective current responses for different pollutants by careful control of the mercury electrode potential. These may be recorded on the X-Y plotter 39 wherein the current response is plotted along the Y axis with respect to electrode potential on the X axis.

The second or alternate procedure relates to pollutants which can be made to form solids as a result of the electrode reaction, e.g., $$Cl_2(g) + 2Hg(l) \rightarrow Hg_2Cl_2(S), \text{ or}$$

$$Cl^- + Hg(l) \rightarrow \tfrac{1}{2} Hg_2Cl_2(S) + e^-.$$

In this case the pollutant is accumulated while controlling the potential of the mercury electrode 19 at a constant value for a reproducible length of time. Then, when the reaction products have concentrated at the mercury electrode surface, the pollutants are determined by changing the potential of the mercury electrode so as to reverse the reactions. During this step, the X-Y plotter 39 is connected to record electrolysis current along one axis and potential along the other axis as a quantitative measure of the original concentration of particular pollutants present in the air.

In order to more clearly describe the method of operation of the device the following examples are presented. In each of the examples the detector cell used was machined from a 1½-inch diameter Teflon rod and the thin layer of electrolyte solution was contained in a circular disc, preferably of Whatman No. 541 filter paper. The air, used to prepare air streams containing electro-active impurities, was delivered from tanks of high purity breathing air, and was passed through a scrubbing tower containing distilled water before use. The electrolyte solution used was that as defined hereinabove.

EXAMPLE I

Air mixtures containing small, known concentrations of SO$_2$ were introduced to the detector by directing a stream of air of known velocity over a calibrated permeation tube containing SO$_2$ and then over the cell. The SO$_2$ permeation tube delivered 1.14 × 10$^{-5}$ ml SO$_2$/sec. at a controlled temperature of 29.0 ± 0.2°C. The air flow rate, measured with calibrated rotameters, was adjustable over a wide range (from 1 ml/sec. to 216 ml/sec.) so that SO$_2$ concentrations down to 53 parts per billion could be prepared.

Figure 3:
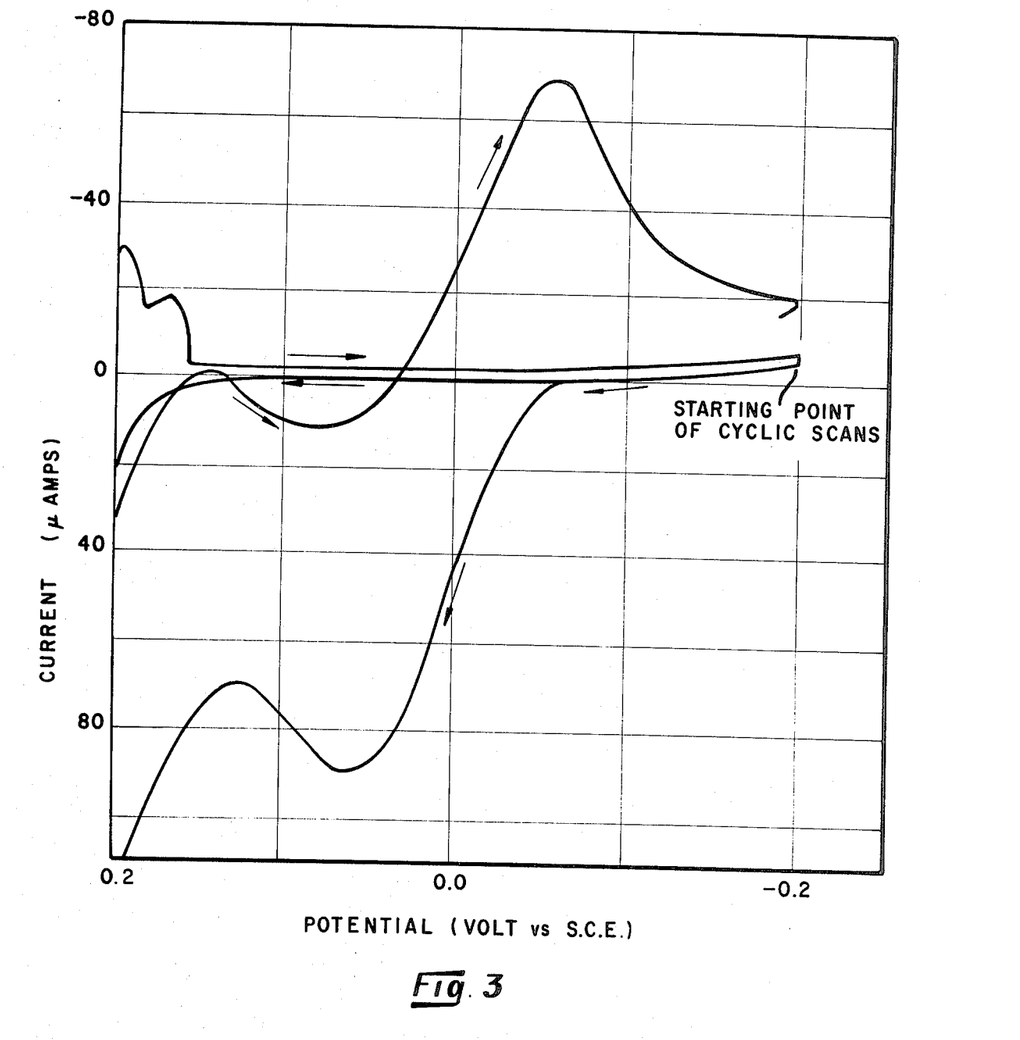
FIG. 3 is a current-voltage plot for cyclic scans of the mercury electrode potential of the detector cell with and without the presence of $SO_2$ as the pollutant at the 10 ppm level.

In one experiment, an SO$_2$-air mixture containing 10 ppm SO$_2$ was passed over the cell for one minute. During this time the electrodes were disconnected from the voltammeter and the flow of electrolyte solution through the cell was stopped. In this manner, a dilute solution of aqueous SO$_2$ was produced in the stationary, thin-layer of solution in the cell. The cell leads were then connected to the voltammeter and the potential of the mercury electrode was scanned at a rate of 1.0 volt/minute from −0.200 volt to +0.200 volt, then back to −0.200 volt vs. reference electrode (saturated calomel electrode, S.C.E.). A trace of the resulting current-voltage curve is shown in FIG. 3. Also shown is a blank scan for comparison in which no SO$_2$ was introduced prior to the cyclic scan. The oxidation and reduction currents flowing in the region of 0.00 volt vs. S.C.E. are due to the reversible reaction:

$$Hg + 2 SO_2(aq) + 2 H_2O \rightleftarrows Hg(SO_3)_2^= + 4H^+ + 2e^-.$$

EXAMPLE II

Figure 4:
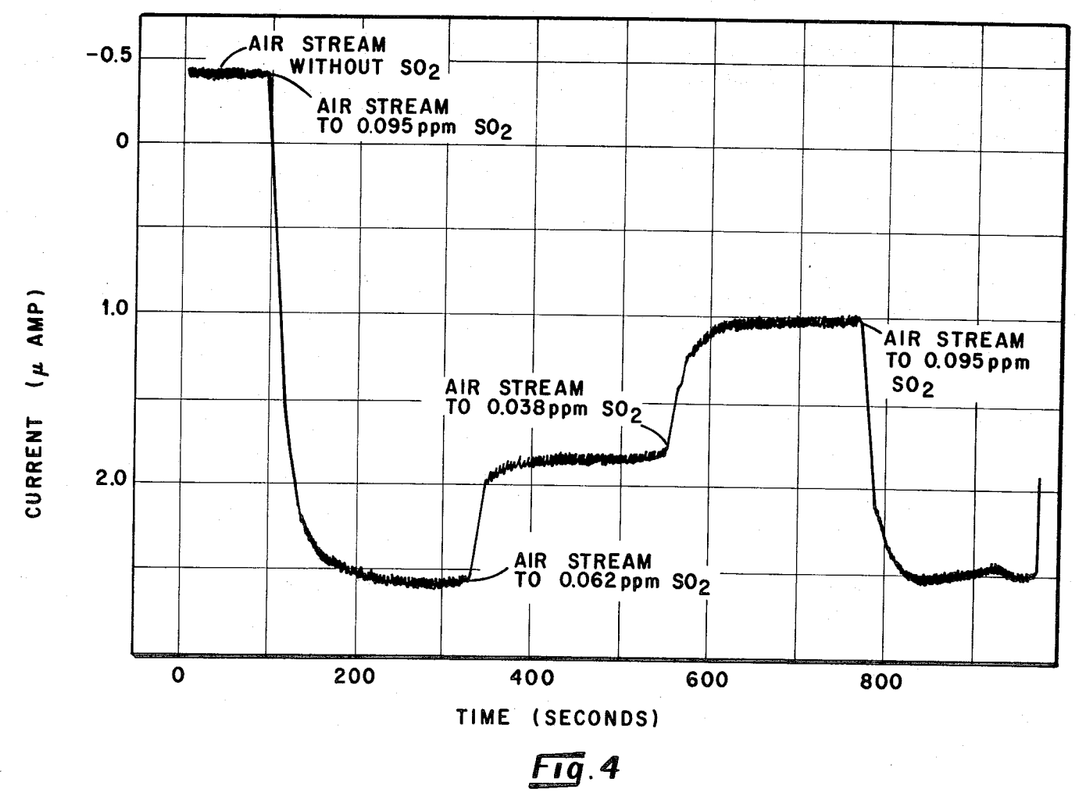
FIG. 4 is a plot showing the current response of the detector system at a fixed mercury electrode potential for varying concentrations of $SO_2$ exposure.

FIG. 4 shows the current response of the detector system to $SO_2$ in air using much lower concentrations of $SO_2$. The air samples were prepared in the same manner as described above in Example I. In this experiment, the potential of the mercury electrode was held constant at +0.100 volt vs. S.C.E. and the electrolyte solution was allowed to flow slowly through the cell to remove electrode reaction products. The $SO_2$ concentration in the air was then changed to different values. The current flowing at 0.100 volt resulted from $SO_2$ diffusing through the electrolyte solution to the mercury electrode to form $Hg(SO_3)_2^=$. The magnitude of the current is proportional to the $SO_2$ concentration in the air.

EXAMPLE III

To form $Cl_2$, a constant current was passed between platinum electrodes immersed in a saturated NaCl - 0.01M HCl solution contained in an H-type electrolytic cell. An air stream of known flow rate was passed through the anode compartment of the H-cell to carry away the $Cl_2$ produced there. The magnitude of the applied current and the gas flow rate were used to calculate the concentration of $Cl_2$ in the air stream.

Figure 5:
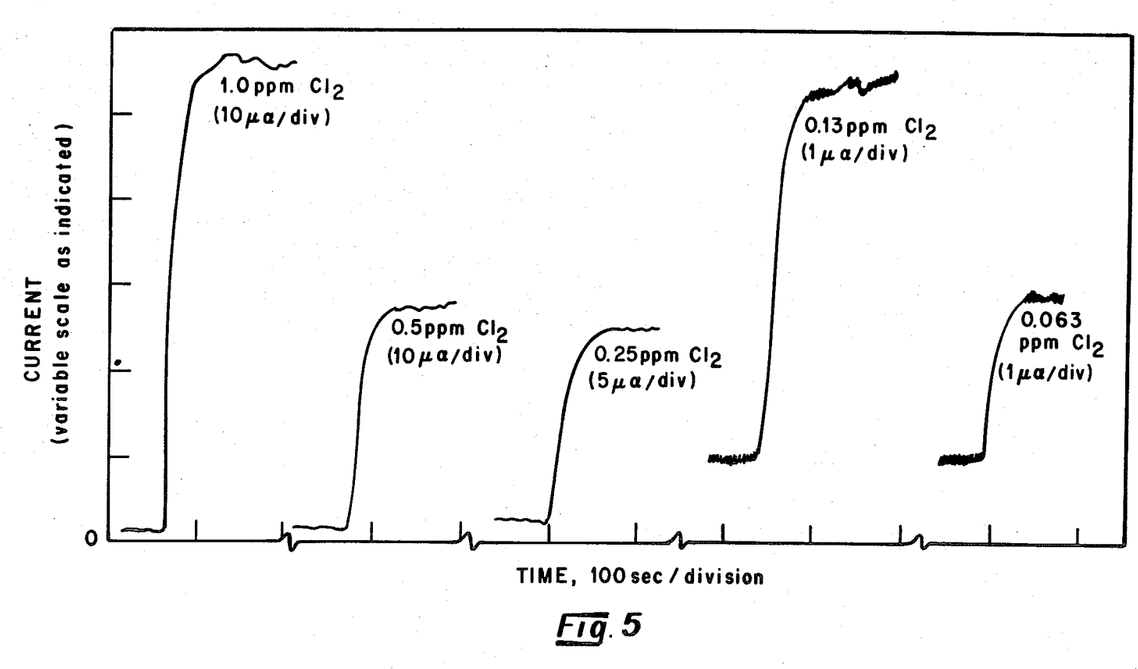
FIG. 5 is a plot as shown in FIG. 4 for varying concentrations of $Cl_2$ as the pollutant.

FIG. 5 presents traces of a series of current-time plots obtained by passing air containing several concentrations of chlorine, as indicated in the figure, over the cell, with the potential of the mercury electrode controlled at +0.05 volt vs. S.C.E. At this potential, the reaction $$Cl_2 + 2e \rightarrow 2 Cl^-$$

occurs with 100 percent current efficiency. The limiting currents are directly proportional to the concentration of chlorine in the air.

EXAMPLE IV

Figure 6:
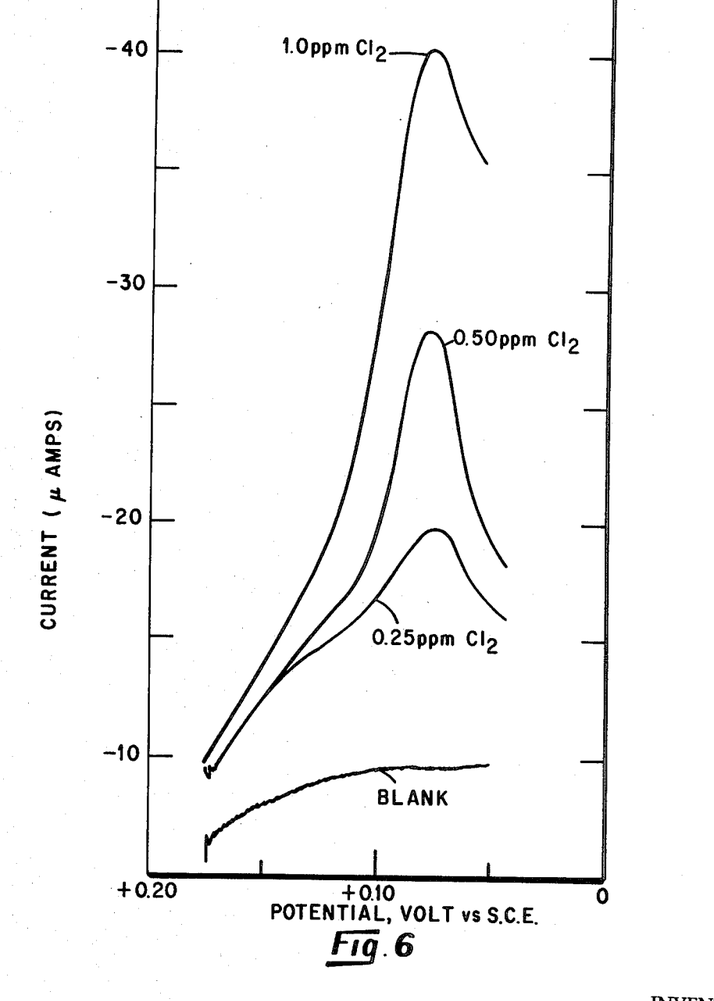
FIG. 6 shows a family of current-voltage plots for various concentrations of $Cl_2$ in air.

Since chlorine gas can react directly with mercury according to the following reaction:

$$Hg + \tfrac{1}{2} Cl_2 \rightarrow \tfrac{1}{2} Hg_2Cl_2(S),$$

the gas was passed over the cell with the cell leads disconnected from the voltammeter. After a measured length of time, the gas stream was diverted, the leads were reconnected to the instrument, and the potential of the mercury electrode was scanned from +0.175 volt to +0.050 volt vs. S.C.E. at a rate of 1 volt/minute. Some typical current-voltage curves obtained using this procedure are shown in FIG. 6. Each of the curves was obtained individually by directing air streams containing the amount of $Cl_2$ as indicated for each curve over the cell for 5 minutes prior to scanning the mercury electrode. A blank scan is shown at the bottom of the graph to indicate electrode response to air that contains no chlorine.

The reduction currents produced by these scans are due to the electrochemical reaction:

$$Hg_2Cl_2(s) + 2e^- \rightarrow 2Hg + 2Cl^-$$

The amounts of charge transferred during these reductions (i.e., the areas under the current voltage curves) are proportional to the amount of $Hg_2Cl_2$ produced during the first part of the experiment. The amount of $Hg_2Cl_2$ produced is, in turn, proportional to the concentration of $Cl_2$ in the air, if other experimental parameters are constant.

The foregoing experiments show that, by properly controlling cell potential and by using optimum experimental methods, air pollutants at low concentrations (down to at least 20 parts per billion) can be successfully detected and monitored using a thin-layer electrochemical detector. Thus, it will be seen that an electrochemical air pollution monitoring device and method of use thereof have been provided that is both sensitive and specific for a number of pollutants in the atmosphere.

What is claimed is:

1. A device for electrochemical monitoring of pollutants in a gaseous medium, comprising:
   a non-conductive housing having a reservoir compartment therein exposed to said gaseous medium;
   a mercury pool electrode formed in said reservoir compartment;
   a porous member disposed in said reservoir compartment and having a surface thereof contiguous with said mercury pool electrode;
   an electrolyte solution held in suspension by said porous member in contact with the surface of said mercury pool electrode on one side of said porous member and exposed to said gaseous medium on the opposite side of said porous member;
   a reference electrode disposed in said housing in contact with said electrolyte solution; and
   means for controlling the voltage of said mercury pool electrode relative to said reference electrode and measuring the current flow through said electrolyte solution over said mercury pool electrode as an indication of particular pollutants present in said gaseous medium.

2. The device as set forth in claim 1 further including means for providing a preselected flow of electrolyte solution through said porous member.

3. The device as set forth in claim 2 wherein said voltage controlling and current measuring means includes an auxiliary electrode disposed in said housing in contact with said electrolyte solution at a point so as to obtain current flow through said electrolyte solution between said mercury pool electrode and said auxiliary electrode, a voltammeter having a controlled voltage output connected electrically to said mercury pool electrode and first and second current sensing inputs connected respectively to said reference electrode and said auxiliary electrode, and a recording means connected to said voltammeter for recording said current flow through said electrolyte at selected voltages applied to said mercury pool electrode.

4. The device as set forth in claim 3 wherein said reference electrode is composed of saturated calomel.

5. The device as set forth in claim 2 wherein said means for providing a flow of electrolyte solution through said porous member includes a restricted capillary tube having one end connected in fluid communication with said reservoir compartment for controlling the flow of electrolyte solution to said compartment an exit tube connected in fluid communication with said reservoir compartment at a point so as to allow flow of said electrolyte solution over said mercury pool electrode and a vacuum system connected to the other end of said exit tube so as to pump excess solution from said compartment, thereby providing an even flow of fresh electrolyte solution over said mercury pool electrode to prevent excess concentration of reaction products formed at the mercury electrode and electrolyte solution interface.

6. The device as set forth in claim 5 wherein said porous member is a filter paper disc and said reservoir compartment is cylindrical in cross section and of a volume to contain said filter paper disc.

7. A method for measuring pollutants in a gaseous medium, comprising the steps of:

establishing an electrochemical cell composed of a mercury pool electrode and a layer of electrolyte solution disposed over a surface of said mercury pool electrode and exposed to said gaseous medium;

directing a stream of said gaseous medium containing pollutants to be measured onto said exposed area of said electrolyte;

pumping said electrolyte solution over said mercury pool electrode at a rate sufficient to prevent excess concentration of reaction products formed at the mercury pool electrode and electrolyte solution interface;

applying a voltage to said mercury pool electrode to produce electrochemical reaction with a particular pollutant being measured; and measuring the current flow in said electrolyte solution as an indication of quantity of said particular pollutant being measured.

8. The method as set forth in claim 7 wherein said electrolyte solution is 0.2 F $Na_2SO_4$, 0.05 F $Na_2HPO_4$ and 0.01 F $NaH_2PO_4$ and said pollutants are $SO_2$ and $Cl_2$.

* * * * *

UNITED STATES PATENT OFFICE
CERTIFICATE OF CORRECTION

Patent No. 3,713,994            Dated January 30, 1973

Inventor(s) Wilbur D. Shults et al.

It is certified that error appears in the above-identified patent and that said Letters Patent are hereby corrected as shown below:

Column 1, line 12, for "obtained" read "obtain".

Column 2, lines 66 and 67 for "constructed" read "constricted".

Column 6, line 46, "preselected" should be deleted.

Column 6, line 47, after "member" should be added "sufficient to remove reaction products".

Signed and sealed this 3rd day of July 1973.

(SEAL)
Attest:

EDWARD M. FLETCHER, JR.          Rene Tegtmeyer
Attesting Officer                Acting Commissioner of Patents